US010582508B2

(12) United States Patent
Cui et al.

(10) Patent No.: US 10,582,508 B2
(45) Date of Patent: Mar. 3, 2020

(54) FACILITATION OF NETWORK RESOURCES

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Hongyan Lei, Plano, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 508 days.

(21) Appl. No.: 14/674,354

(22) Filed: Mar. 31, 2015

(65) Prior Publication Data
US 2016/0295594 A1    Oct. 6, 2016

(51) Int. Cl.
*H04W 28/02* (2009.01)
*H04W 72/04* (2009.01)
*H04L 12/851* (2013.01)
*H04W 72/10* (2009.01)
*H04L 12/911* (2013.01)

(52) U.S. Cl.
CPC ....... *H04W 72/0486* (2013.01); *H04L 47/245* (2013.01); *H04W 28/0268* (2013.01); *H04W 28/0284* (2013.01); *H04L 47/823* (2013.01); *H04W 72/10* (2013.01)

(58) Field of Classification Search
CPC . H04W 72/04; H04W 28/02; H04W 72/0486; H04W 28/0289; H04W 72/10
USPC ........................................ 370/229, 230, 232
See application file for complete search history.

(56) References Cited

U.S. PATENT DOCUMENTS

| 8,072,963 | B2 | 12/2011 | Suzuki | |
|---|---|---|---|---|
| 8,396,481 | B2 | 3/2013 | Jung et al. | |
| 2002/0186657 | A1* | 12/2002 | Jain | H04L 47/10 370/235 |
| 2003/0035370 | A1* | 2/2003 | Brustoloni | H04L 29/06 370/229 |

(Continued)

FOREIGN PATENT DOCUMENTS

| EP | 2136483 B1 | 6/2011 |
|---|---|---|
| EP | 2724566 A1 | 4/2014 |

(Continued)

OTHER PUBLICATIONS

Shi, et al., "A New Efficient Dynamic System Information Scheduling Strategy in TDD-LTE," Telkomnika, Indonesian Journal of Electrical Engineering, Sep. 2013, pp. 5480-5489, vol. 11, No. 9. Retrieved on Jan. 28, 2015.

(Continued)

*Primary Examiner* — Melvin C Marcelo
*Assistant Examiner* — Natali Pascual Peguero
(74) *Attorney, Agent, or Firm* — Amin, Turocy & Watson, LLP

(57) ABSTRACT

A more efficient network can be achieved by allocating system resources. Dynamic adjustment of system information block periodicity can mitigate system alarms, manual intervention, and performance degradation of the network. System information block messages/data can be given a priority so that resource utilization can be optimized to improve overall system performance. Therefore, system outages can be avoided or mitigated by actively monitoring SIB data and proactively adjusting system resources.

20 Claims, 12 Drawing Sheets

(56) References Cited

U.S. PATENT DOCUMENTS

| | | | |
|---|---|---|---|
| 2005/0010660 A1* | 1/2005 | Vaught | H04L 41/024 709/223 |
| 2006/0007934 A1* | 1/2006 | Chemiakina | H04L 29/06 370/395.4 |
| 2006/0270385 A1* | 11/2006 | Morris | H04B 17/318 455/405 |
| 2009/0181661 A1 | 7/2009 | Kitazoe et al. | |
| 2010/0068993 A1 | 3/2010 | Khan | |
| 2012/0100853 A1* | 4/2012 | Xiong | 455/436 |
| 2012/0220329 A1 | 8/2012 | Kitazoe et al. | |
| 2013/0188499 A1* | 7/2013 | Mach | H04W 48/20 370/252 |
| 2013/0194982 A1 | 8/2013 | Fwu et al. | |
| 2013/0286965 A1 | 10/2013 | Xu et al. | |
| 2013/0301490 A1 | 11/2013 | He et al. | |
| 2013/0301492 A1 | 11/2013 | Ji et al. | |
| 2013/0337814 A1 | 12/2013 | Wong et al. | |
| 2014/0003262 A1 | 1/2014 | He et al. | |
| 2014/0029486 A1 | 1/2014 | Li et al. | |
| 2014/0036812 A1 | 2/2014 | Malladi et al. | |
| 2014/0056220 A1 | 2/2014 | Poitau et al. | |
| 2014/0133294 A1* | 5/2014 | Horn | H04W 28/0247 370/230 |
| 2014/0254365 A1* | 9/2014 | Yanagisawa | H04L 67/06 370/232 |
| 2014/0293908 A1 | 10/2014 | Kumar et al. | |
| 2014/0302855 A1 | 10/2014 | Nory et al. | |
| 2014/0321275 A1* | 10/2014 | Anand | H04L 47/125 370/232 |
| 2014/0334353 A1 | 11/2014 | Wei | |
| 2014/0334372 A1 | 11/2014 | Vos | |
| 2015/0180924 A1* | 6/2015 | O'Callaghan | H04L 65/605 709/219 |
| 2015/0381515 A1* | 12/2015 | Mattson | H04L 41/145 707/609 |
| 2016/0296115 A1* | 10/2016 | Wang | G06F 19/3406 |

FOREIGN PATENT DOCUMENTS

| | | |
|---|---|---|
| GB | 2497604 A | 6/2013 |
| WO | 2011050996 A1 | 5/2011 |
| WO | 2011063002 A1 | 5/2011 |
| WO | 2014153688 A1 | 10/2014 |

OTHER PUBLICATIONS

Lee, et al., "Analysis of Service Interruption Time due to System Information Measurement in 3GPP LTE Femtocell," Proceedings of the 5th International Conference on Ubiquitous Information Management and Communication, 2011, 5 pages, ACM, 2011. Retrieved on Jan. 28, 2015.

Pandey, "LTE-3G Inter-Operability Study," Oct. 2013, 108 pages, Retrieved on Jan. 28, 2015.

* cited by examiner

FACILITATION OF NETWORK RESOURCES

TECHNICAL FIELD

This disclosure relates generally to facilitating usage of network resources based on usage and priority data. For example, this disclosure relates to the availability of radio resources of a network in conjunction with an access point and mobile devices.

BACKGROUND

Advances in cellular phone and related network technology (e.g., microprocessor speed, memory capacity, data transfer bandwidth, software functionality, and the like) have generally contributed to increased cellular application in various settings. For example, today's cellular phones can perform many functions previously reserved for personal computers or other devices, such as web browsing, picture/video shooting, picture/video sharing, instant messaging, file sharing, and the like. As cellular phone capabilities increase, which can also increase demand for the capabilities, networks and protocols are developed to effectively support the capabilities.

Network resources, for mobile devices, can sometimes be strained based on mobile-device usage and demand. Furthermore, a particular network resource can be strained due to a specific demand for that particular network resource. System information block (SIB) messages can provide critical information and guidance to user equipment (UE) devices. SIBs can comprise radio resource configuration information, barring information, and radio resource configuration common channels. However, SIBs can be limited resources, which can become congested based on resource utilization.

The above-described background relating to a SIB resource allocation is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
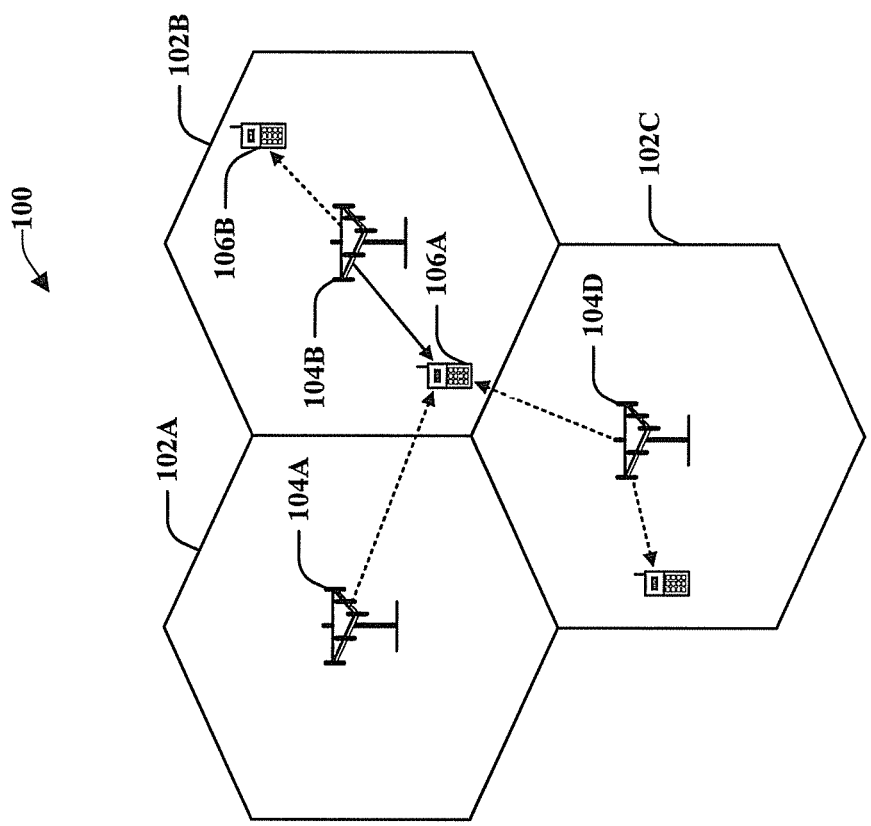
FIG. 1 illustrates an example communications network according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional cellular network resource management, various embodiments are described herein to facilitate utilization of network resources based on priority data.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Described herein are systems, methods, articles of manufacture, and other embodiments or implementations that can facilitate network resource management. Facilitating network resource utilization can be implemented in connection with any type of device with a connection to the communications network such as: a mobile handset, a computer, a handheld device, or the like.

System information block (SIB) messages can provide critical system information and guidance to user equipment (UE) within long-term evolution (LTE) networks. SIB messages can comprise information regarding system information acquisition, change monitoring procedures, mobility, etc. $3^{rd}$ generation partnership project (3GPP) specifications provide the foundation for SIB, SIB modification, and SIB transmission periodicity, which is configurable and can be modified. A SIB message can be broadcast by an evolved node-b (eNB) to UE devices and tell the UE devices common information about the cell. There are multiple SIBs—each with a specific purpose and a list of parameters as defined by the 3GPP. When a UE device powers up and acquires synchronization with the eNB, it can listen to the SIB for cell selection, cell reselection, how to start a call, etc. SIB messages can also comprise common public information data to assist a UE device in accessing a network. UE devices can also display SIB message data via a display associated with the UE device.

SIB periodicity can be defined as the time or frequency with which network resource data is communicated via a wireless network. Adaptive SIB periodicity, can be defined as the ability to dynamically adjust SIB periodicity based on an overall SIB load/usage condition. SIB-related messages/data can be given a priority so that resource utilization can be optimized to improve overall system performance. System outages can be avoided or mitigated by actively monitoring SIB data and proactively adjusting system resources, system alarms, manual intervention, and performance degradation. LTE systems can comprise SIBs and master information blocks (MIB). Consequently, SIB messages can be used to assist network monitoring on different frequencies for various cells.

Although SIBs are limited resources, the deployment of heterogeneous networks (HetNet), wireless local area networks (WLAN), and cellular integration, etc. can increase the need for SIB messages. Therefore, the need to reduce SIB message congestion will increase. Although 3GPP standard 36.331 can allow changes to SIB periodicity and priority, it only allows each SIB message/parameter to be adjusted in isolation via an operation support system (OSS) configuration. Therefore, the current 3GPP standard cannot efficiently handle SIB congestion, other than reactively triggering alarms if congestion occurs.

Since some SIBs are time sensitive, and other SIBs can allow longer time intervals without impacting network performance, it is possible to dynamically adjust SIB periodicity based on an overall SIB load/usage. Associating SIB load/usage with a condition and/or SIB message priority can optimize resource utilization and improve overall system performance. Adaptive SIB periodicity can be used across various networks (evolved node B, self-organizing network, or centralized radio access network) to monitor SIB usage across all SIB messages.

Satisfying a predetermined threshold (e.g. indicating SIB congestion) can be used as a condition to trigger proactively adjusting or resetting (when SIB load reduces) SIB periodicity based on priority of SIB messages. SIB messages can also be prioritized based on a historical value associated with the SIB. For instance, a SIB that has previously been used as a resource may receive priority over a SIB, which has never been used. Time sensitive SIBs can also keep the same periodicity if possible. For example, SIBs that carry critical radio resource configuration data and basic cell reselection data can maintain their periodicity so as not to bias the utilization of a critical radio resource. SIBs that are less time sensitive, such as those that carry additional cell reselection data, can gradually extend their periodicity to reduce the load. Furthermore, non-time sensitive SIBs, such as those that carry the name of home evolve node B, can have their periodicity extended to reduce load congestion. The resource can also be delayed or terminated to facilitate network efficiency if congestion is severe. Thus, the periodicity can be proportional to network congestion.

When network congestion has been determined, the periodicity of those SIBs that can tolerate longer intervals can be increased to save space for more time sensitive SIBs. Consequently, active monitoring and proactive adjustments can mitigation alarms, manual intervention, significant performance degradation, and system outages. It should be appreciated that the concept of proactively adjusting the periodicity of control signaling broadcasts can also be extended to other technologies such as universal mobile telecommunications system (UMTS), wireless fidelity (Wi-Fi), and 5G.

In one embodiment, described herein is a method comprising receiving network resource data and monitoring the resource data for a condition related to network congestion. A determination can then be made that the condition related to the network congestion has been satisfied based on the network resource data. After the determination is made, an action can be performed in response to the condition related to the network congestion being determined to have been satisfied.

According to another embodiment, a system can facilitate receiving network message data related to an availability of a network resource associated with another network device. The system can also determine whether the availability of the network resource has satisfied a condition and adjust a transmission rate of another network resource in response to a determination that the availability of the network resource has been satisfied. Furthermore, the system can send other network message data related to the other network resource.

According to yet another embodiment, described herein is a computer readable medium that can perform the operations comprising receiving network message data related to an availability of a network resource associated with a network device and prioritizing the network resource based on classification data. Once the network resource has been prioritized, a transmission rate of another network resource can be increased in response to determining that the network resource is available based on the message data. Thereafter the computer readable medium can send other network message data related to the other network resource to a mobile device.

These and other embodiments or implementations are described in more detail below with reference to the drawings.

Referring now to FIG. 1, illustrated is an example communications network according to one or more embodiments. Wireless communication system 100 (e.g., network) can support a plurality of subscribers (e.g., mobile devices, etc.). By way of example, the system 100 can provide communication for multiple cells 102A-102C, with each cell being serviced by a corresponding access point (AP) 104 (such as APs 104A-104C). Each cell may be further divided into one or more sectors (e.g. to serve one or more frequencies). Various access terminals (ATs) 106, including ATs 106A-106C, also known interchangeably as user equipment (UE) or mobile devices, can be dispersed throughout the system.

It can to be appreciated that the wireless communication system 100 can provide service over a geographic region. For example, the cells 102A-102C may cover a few blocks, square acres, or square miles. In addition, it can be appreciated that a virtually infinite number of cells 102 can be employed to cover a large geographic region, such as a state, country, continent, etc. In this way, a single service provider can enable virtually uninterrupted wireless communication service across a large geographic region. The service provider may desire to determine and/or employ a location of an AP (e.g., a cell site location) for a set of network services. The set of network services can include but are not limited to network locating, network optimizing, and/or network modeling. For example, the location of a UE 106B can be determined by identifying one or more APs (e.g., AP 104B) serving (or near) the UE 106B.

In one implementation, the system 100 determines a location of an AP (e.g., AP 104B) based on a set of location data for a UE (e.g., UE 106B). The set of location data for the UE (location data) can include but is not limited to a location of a UE (UE location), and a set of propagation delay measurements for communications between the UE and the AP (propagation delay measurements).

Figure 2:
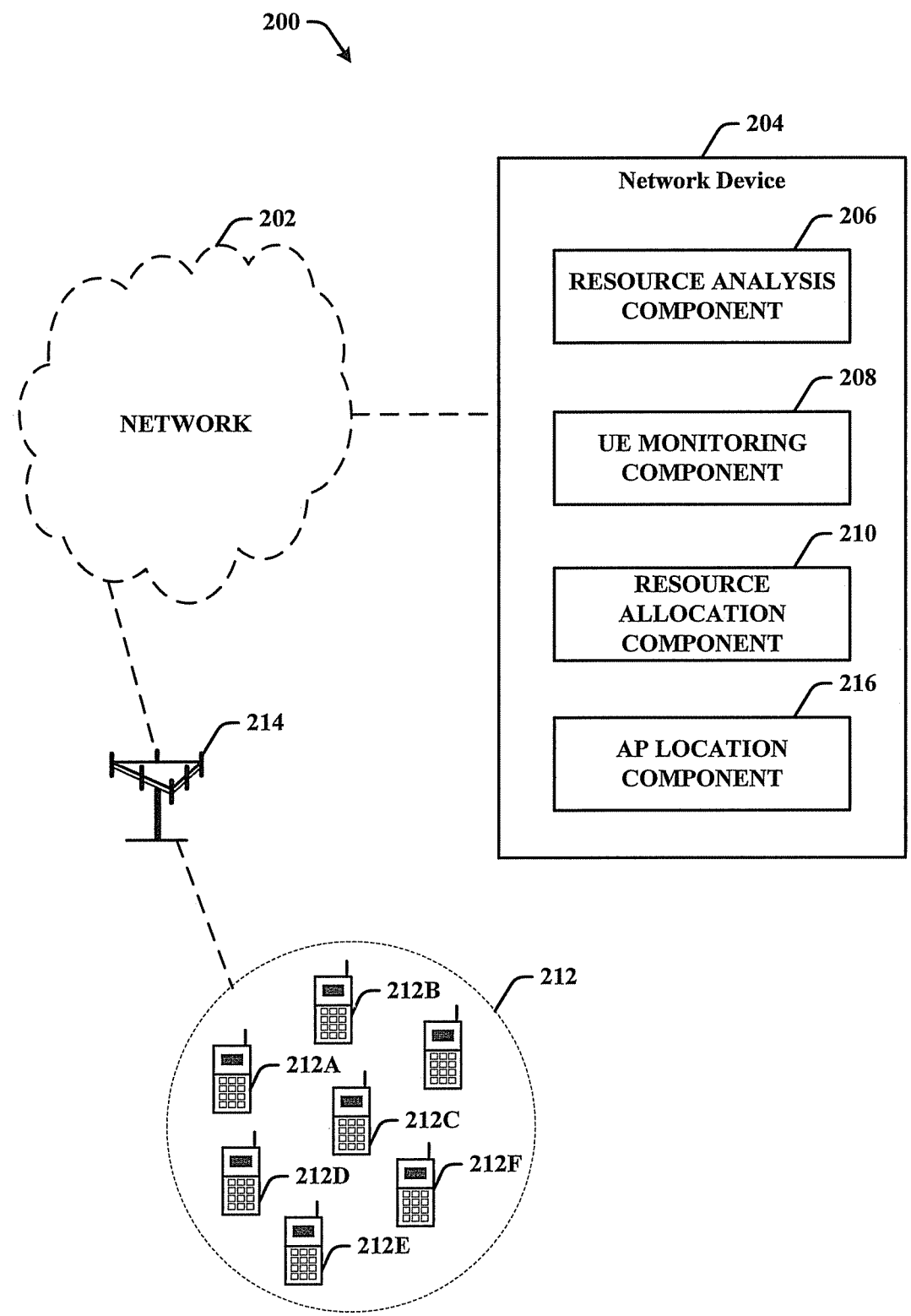
FIG. 2 illustrates an example system for SIB resource distribution according to one or more embodiments.

Referring now to FIG. 2, illustrated is an example system for SIB resource distribution according to one or more embodiments. Turning now to FIG. 2, illustrated is a SIB resource system 200. The system 200 can comprise a network 202 (e.g., system 100) and a network device 204. The network device 204 determines a location of an access point 214 (AP 214) associated with the network 202. The network device 204 can comprise a resource analysis component 206, a user equipment (UE) monitoring component 208, a resource allocation component 210, and an AP location component 216.

The resource analysis component 206 can analyze SIB information data received from mobile devices 212A-212F via the AP. The AP location component 216 can determine what area the AP covers and what mobile device 212 is within that specific area. The SIB information data can include, but is not limited to, mobile device identification data, resource data, priority data, and history data. The UE monitoring component can monitor network congestion to determine if SIB resource utilization is congesting the network. Based upon a determined threshold or condition, the network device 204 can throttle SIB resources, via the resource allocation component 209, based on a condition being satisfied. The network device 204 can also throttle SIB resources, via the resource allocation component 209, based on SIB priority and/or history data. For example, if a congestion threshold condition is satisfied, the network device can decrease the periodicity of a SIB resource with a low priority.

Figure 3:
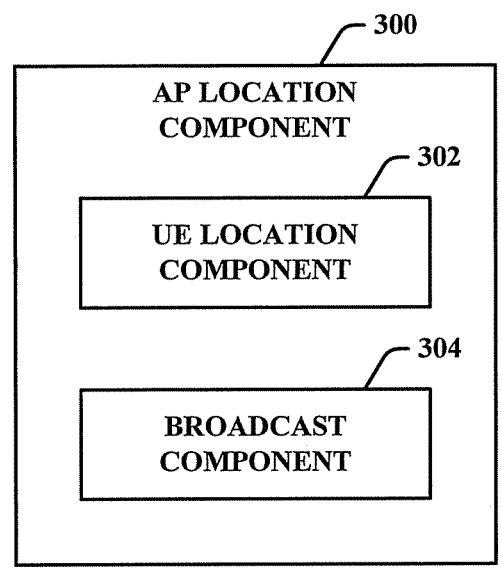
FIG. 3 illustrates an example SIB resource distribution component according to one or more embodiments.

Referring now to FIG. 3, illustrated is an access point location component 300 in accordance with various aspects described. The AP location component can comprise a UE location component 302 and a broadcast component 304. As previously mentioned, the AP location component 300 can be used to determine the location of the AP and the geographic region for which it covers. The geographic region that it covers can include, but is not limited to a geographic radius. The UE location component 302 can determine when a UE is within the geographic region for which the AP can communicate with the UE. Based on a determination of a condition associated with network congestion, the AP location component 300 can broadcast SIB resource data via the broadcast component 304.

Figure 4:
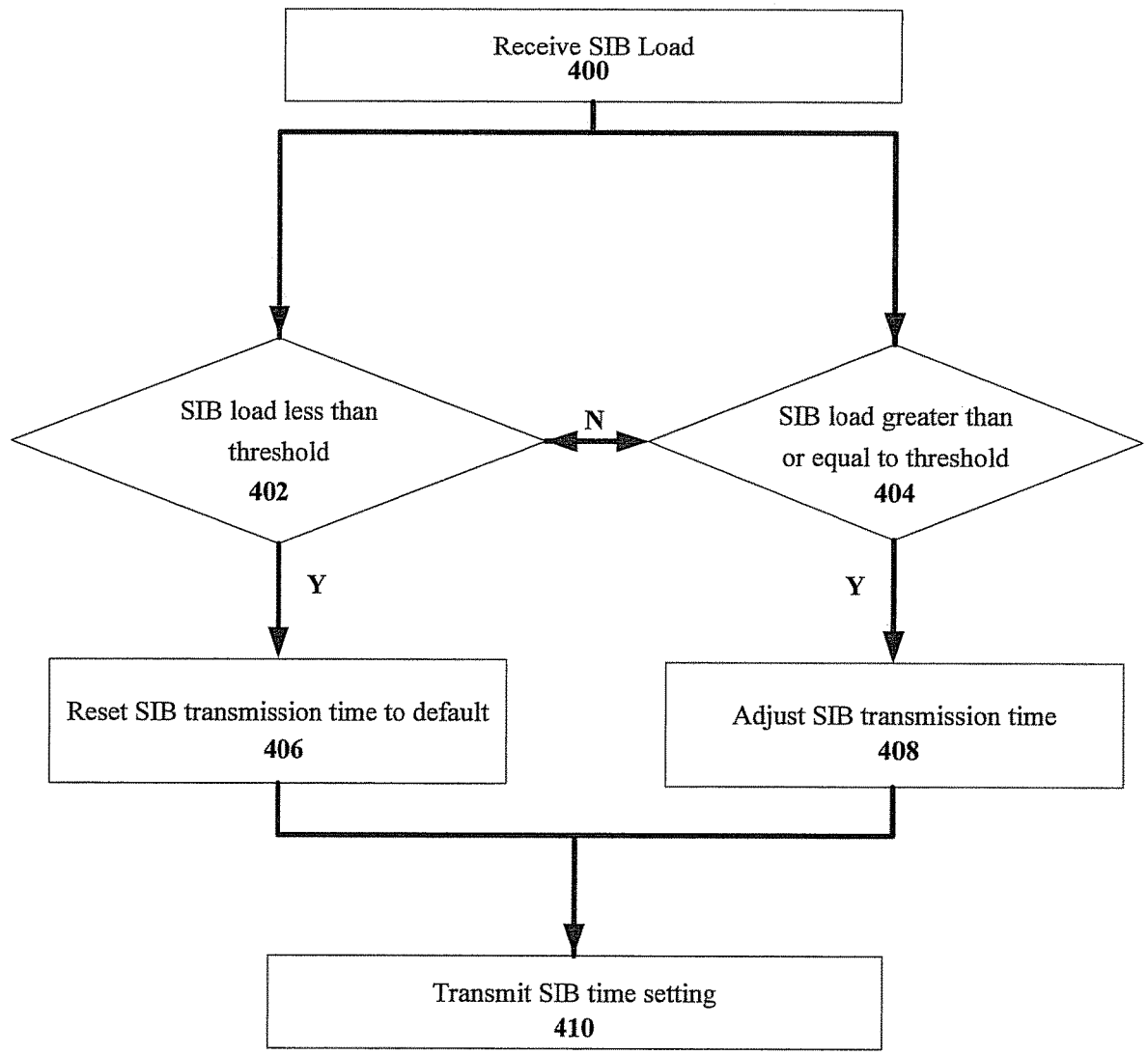
FIG. 4 illustrates a flow diagram for SIB resource distribution according to one or more embodiments.

Referring now to FIG. 4, illustrated is a flow diagram for SIB resource distribution according to one or more embodiments. At element 400, the network can receive SIB load data from UE or mobile devices. The SIB load data can comprise information related to network congestion and which SIBs have priority over other SIBs. The SIB load data can also comprise SIB history information based on which SIBs have been used by mobile devices or UEs previously. Once the SIB load data has been received, an analysis can be performed. The analysis can be based on a predetermined condition associated with network congestion. For instance, if the SIB load is less than a threshold 402, then the SIB transmission time can be set to a default at element 406 and then transmitted to the UE at element 410. However, if the SIB load is not less than the threshold 402 then the SIB load must be greater than or equal to the threshold 404. If the SIB load is greater than or equal to the threshold, then the SIB transmission time can be adjusted at element 408, and the adjusted SIB load transmission time can be transmitted to the UE at element 410.

Figure 5:
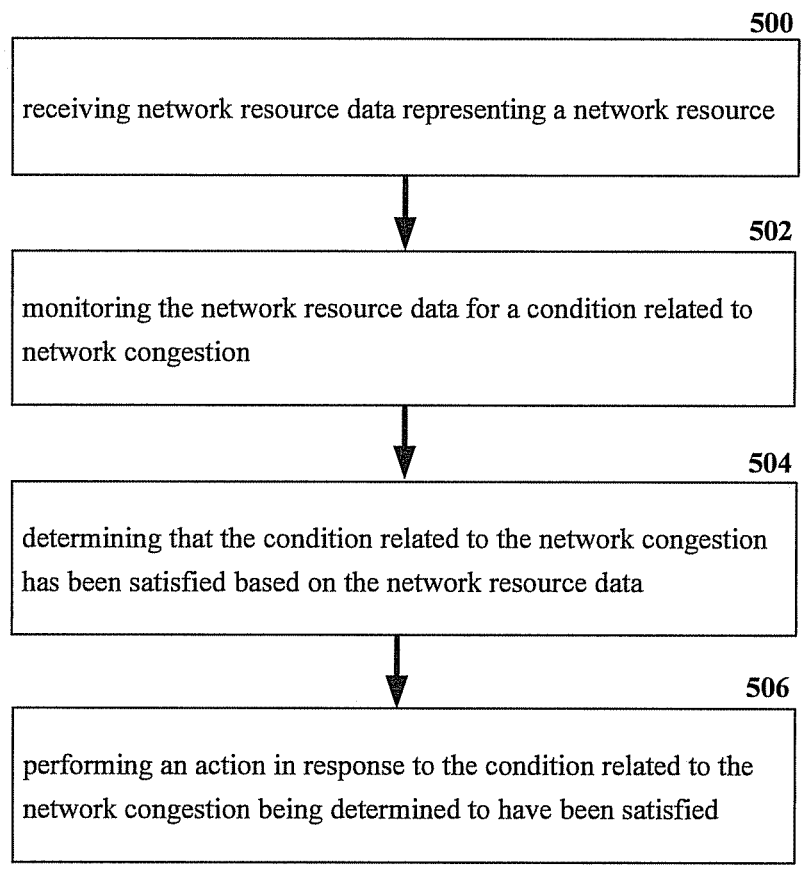
FIG. 5 illustrates a schematic system block diagram of a method for SIB resource distribution according to one or more embodiments.

Referring now to FIG. 5, illustrated is a schematic system block diagram of a method for SIB resource distribution according to one or more embodiments. At element 500, the system can receive network resource data representing a network resource from UE devices. Resources can comprise common public information data to assist a UE device in accessing a network. The UE device can also display resource message data via a display associated with the UE device. The system can then monitor the network resource data for a condition related to network congestion at element 502. Based on monitoring the SIB data, the system can determine that a condition related to the network congestion has been satisfied at element 504. When network congestion has been determined, the periodicity of those SIBs that can tolerate longer intervals can be adjusted to save space for more time sensitive SIBs. Furthermore, at element 506, the system can perform an action in response to the condition related to the network congestion being determined to have been satisfied. By actively monitoring SIB data and proactively adjusting system resources, system alarms, manual intervention, performance degradation, and system outages can be avoided or mitigated. Therefore, proactively adjusting the periodicity of control signaling broadcasts can increase system efficiencies.

Figure 6:
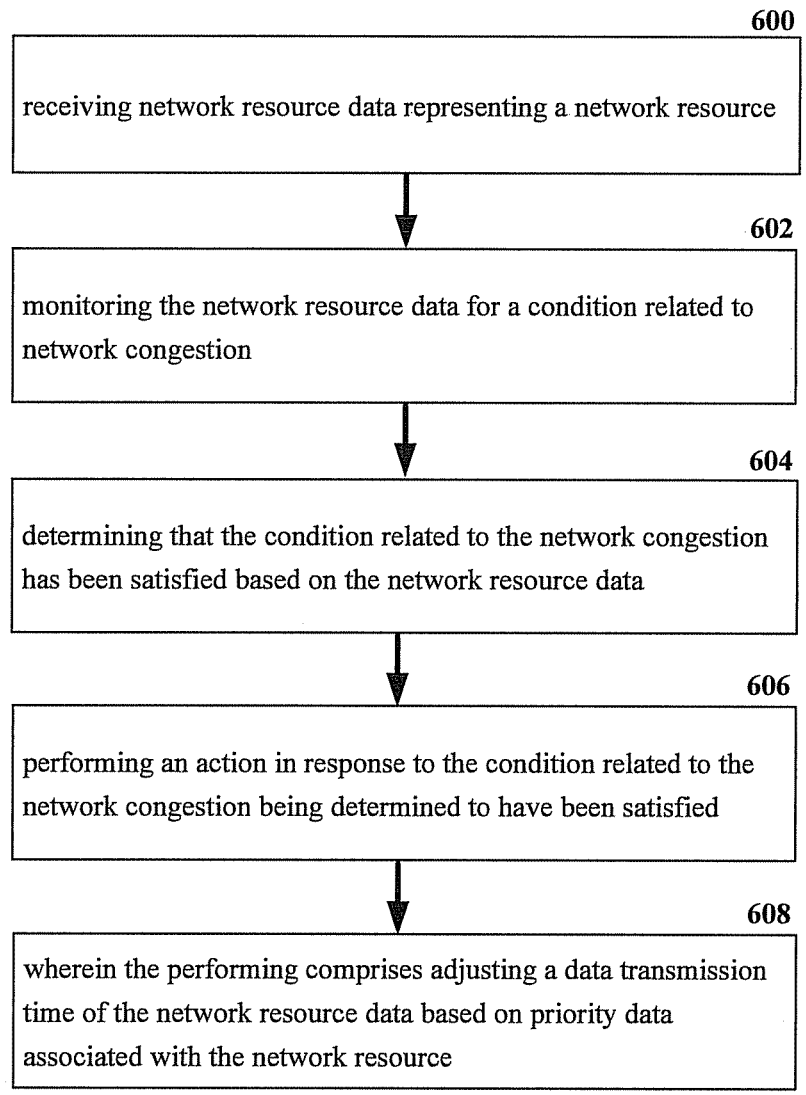
FIG. 6 illustrates a schematic system block diagram of a method for SIB resource distribution comprising adjusting a data transmission time according to one or more embodiments.

Referring now to FIG. 6, illustrated is a schematic system block diagram of a method for SIB resource distribution comprises adjusting a data transmission time according to one or more embodiments. At element 600, the system can receive network resource data representing a network resource from UE devices. Resources can comprise common public information data to assist a UE device in accessing a network. The UE device can also display resource message data via a display associated with the UE device. The system can then monitor the network resource data for a condition related to network congestion at element 602. Based on monitoring the SIB data, the system can determine that a condition related to the network congestion has been satisfied at element 604. When network congestion has been determined, the periodicity of those SIBs that can tolerate longer intervals can be adjusted to save space for more time sensitive SIBs. Furthermore, at element 606, the system can perform an action in response to the condition related to the network congestion being determined to have been satisfied. At element 608, the performing can comprise adjusting a data transmission time of the network resource data based on priority data associated with the network resource. By actively monitoring SIB data and proactively adjusting system resources, system alarms, manual intervention, performance degradation, and system outages can be avoided or mitigated. Therefore, proactively adjusting the periodicity of control signaling broadcasts can increase system efficiencies.

Figure 7:
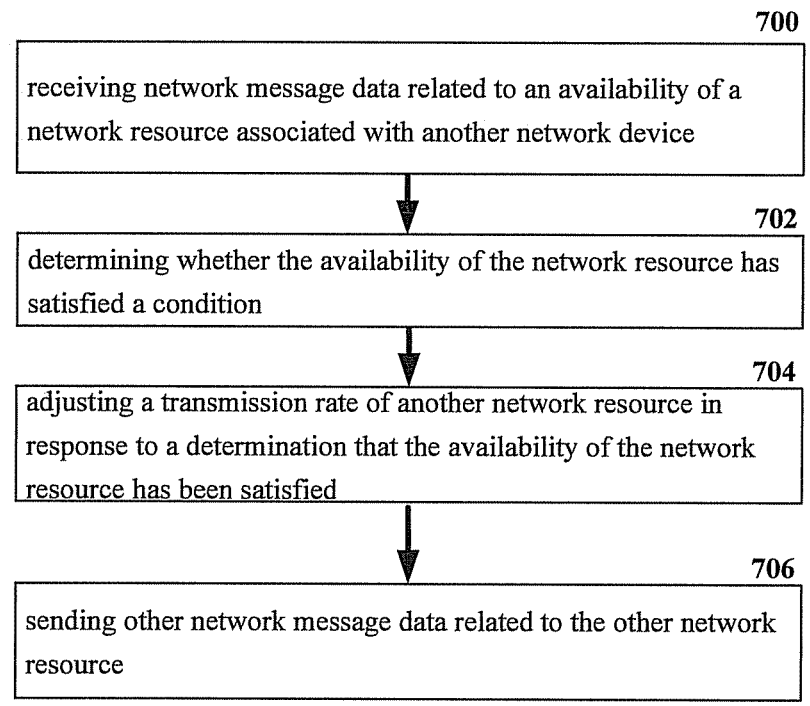
FIG. 7 illustrates a schematic system block diagram for a system related to SIB resource distribution according to one or more embodiments.

Referring now to FIG. 7, illustrated is a schematic system block diagram for a system related to SIB resource distribution according to one or more embodiments. At element 700, the system can receive network message data related to an availability of a network resource associated with another network device. Network resources can comprise common public information data to assist a UE device in accessing a network. The UE device can also display resource message data via a display associated with the UE device. The system can also determine whether the availability of the network resource has satisfied a condition at element 702. Satisfying a predetermined threshold (e.g. indicating SIB congestion) can be used as a condition to trigger proactively adjusting or resetting (when SIB load reduces) SIB periodicity based on priority of SIB messages. SIB messages can also be prioritized based on a historical value associated with the SIB. For instance, a SIB that has previously been used as a resource, may receive priority over a SIB which has never been used. Time sensitive SIBs can also keep the same periodicity if possible.

At element 704, the system can adjust a transmission rate of another network resource in response to a determination that the availability of the network resource has been satisfied. For instance, if one SIB's periodicity is increased due to a condition associated with network congestion being determined to have been satisfied, then another SIB's periodicity can be decreased. Once the transmission rate of a SIB has been adjusted at element 704, other network message data related to the other network resource can be sent to the UE at element 706.

Figure 8:
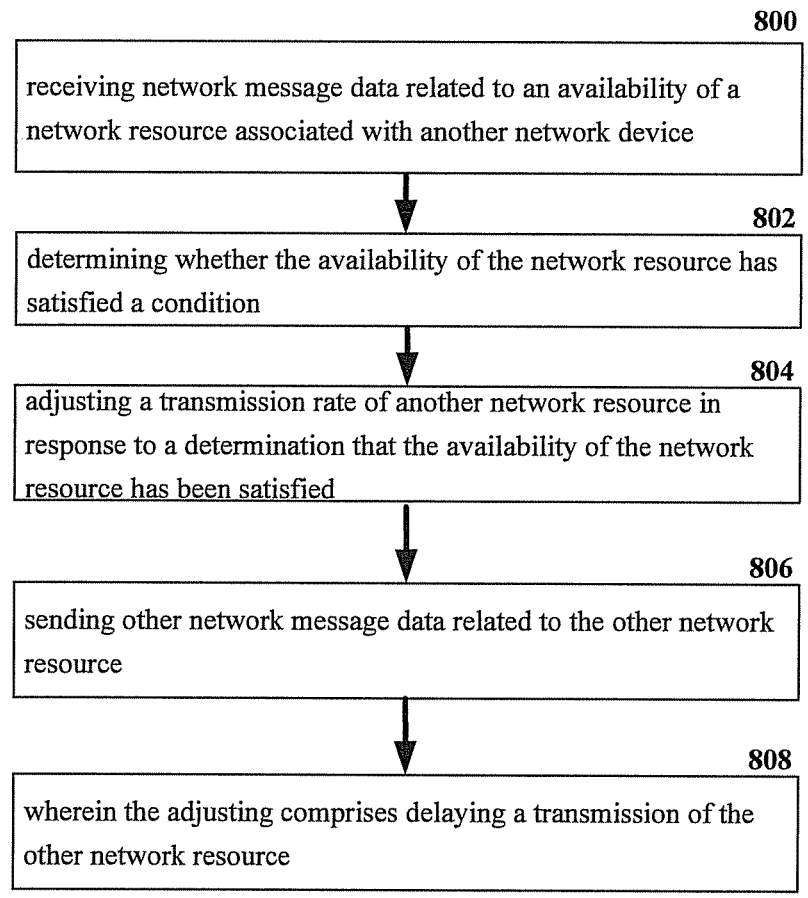
FIG. 8 illustrates a schematic system block diagram for a system related to SIB resource distribution comprising delaying a data transmission time according to one or more embodiments.

Referring now to FIG. 8, illustrated is a schematic system block diagram for a system related to SIB resource distribution comprising delaying a data transmission time according to one or more embodiments. At element 800, the system can receive network message data related to an availability of a network resource associated with another network device. Network resources can comprise common public information data to assist a UE device in accessing a network. The UE device can also display resource message data via a display associated with the UE device. The system can also determine whether the availability of the network resource has satisfied a condition at element 802. Satisfying a predetermined threshold (e.g. indicating SIB congestion) can be used as a condition to trigger proactively adjusting or resetting (when SIB load reduces) SIB periodicity based on priority of SIB messages. SIB messages can also be prioritized based on a historical value associated with the SIB. For instance, a SIB that has previously been used as a resource, may receive priority over a SIB which has never been used. Time sensitive SIBs can also keep the same periodicity if possible.

At element 804, the system can adjust a transmission rate of another network resource in response to a determination that the availability of the network resource has been satisfied. The adjusting can also comprise delaying a transmission of the other network resource at element 808. For instance, if one SIB's periodicity is increased due to a condition associated with network congestion being determined to have been satisfied, then another SIB's periodicity can be decreased. Once the transmission rate of a SIB has been adjusted at element 804, other network message data related to the other network resource can be sent to the UE at element 806.

Figure 9:
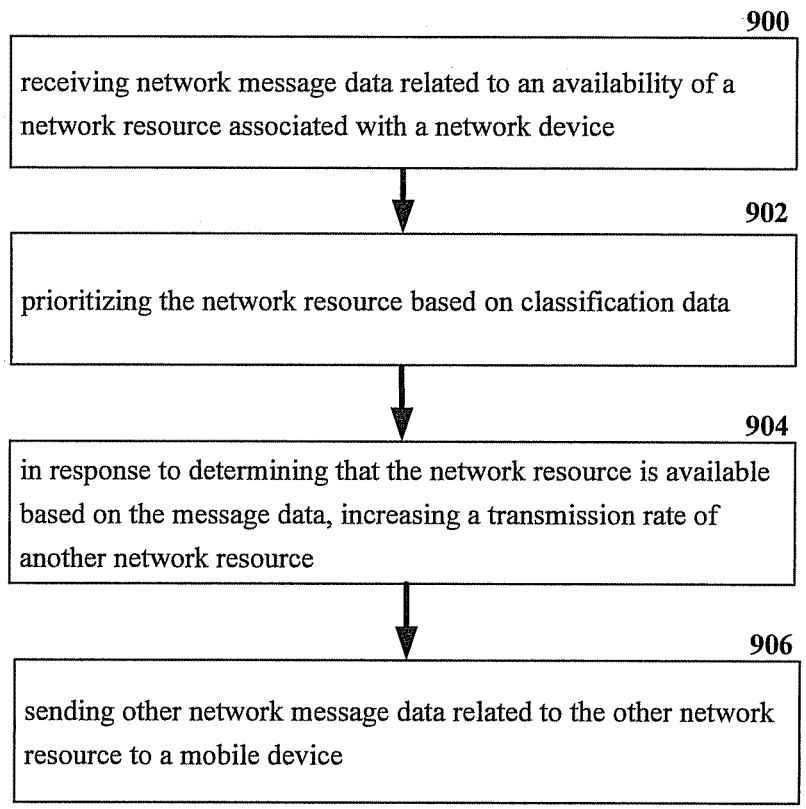
FIG. 9 illustrates a schematic system block diagram of a computer-readable storage device for allocating SIB resources according to one or more embodiments.

Referring now to FIG. 9, illustrated is a schematic system block diagram of a computer-readable storage device for allocating SIB resources according to one or more embodiments. At element 900, the system can receive network message data related to an availability of a network resource associated with a network device. Network resources can comprise common public information data to assist a UE device in accessing a network. The UE device can also display resource message data via a display associated with the UE device. At element 902, the system can prioritize the network resource based on classification data. SIB messages can also be prioritized based on a historical value associated with the SIB. For instance, a SIB that has previously been used as a resource may receive priority over a SIB which has never been used. Time sensitive SIBs can also keep the same periodicity if possible. SIBs that carry critical radio resource configuration data and basic cell reselection data can maintain their periodicity so as not to bias the utilization of a critical radio resource. SIBs that are less time sensitive, such as those that carry additional cell reselection data, can gradually extend their periodicity to reduce the load.

In response to determining that the network resource is available based on the message data, a transmission rate of another network resource can be increased at element 904. For instance, if one SIB's periodicity is decreased due to a condition associated with network congestion being determined to have been satisfied, then another SIB's periodicity can be increased. Consequently, other network message data related to the other network resource can be sent to a mobile device at element 906.

Figure 10:
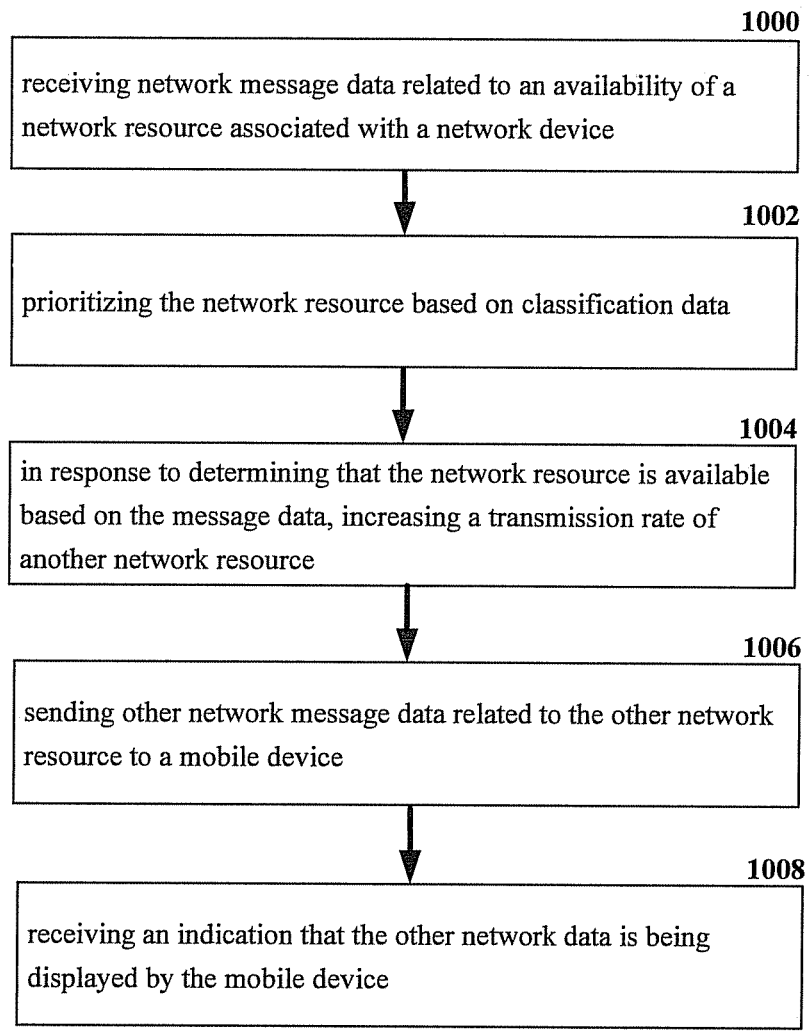
FIG. 10 illustrates a schematic system block diagram of a computer-readable storage device for allocating SIB resources wherein the network data is displayed on the network device according to one or more embodiments.

Referring now to FIG. 10, illustrated is a schematic system block diagram of a computer-readable storage device for allocating SIB resources wherein the network data is displayed on the network device according to one or more embodiments. At element 1000, the system can receive network message data related to an availability of a network resource associated with a network device. Network resources can comprise common public information data to assist a UE device in accessing a network. The UE device can also display resource message data via a display associated with the UE device. At element 1002, the system can prioritize the network resource based on classification data. SIB messages can also be prioritized based on a historical value associated with the SIB. For instance, a SIB that has previously been used as a resource, may receive priority over a SIB which has never been used. Time sensitive SIBs can also keep the same periodicity if possible. SIBs that carry critical radio resource configuration data and basic cell reselection data can maintain their periodicity so as not to bias the utilization of a critical radio resource. SIBs that are less time sensitive, such as those that carry additional cell reselection data, can gradually extend their periodicity to reduce the load.

In response to determining that the network resource is available based on the message data, a transmission rate of another network resource can be increased at element 1004. For instance, if one SIB's periodicity is decreased due to a condition associated with network congestion being determined to have been satisfied, then another SIB's periodicity can be increased. Consequently, other network message data related to the other network resource can be sent to a mobile device at element 1006. Furthermore, the system can receive an indication that the other network data is being displayed by the mobile device at element 1008.

Figure 11:
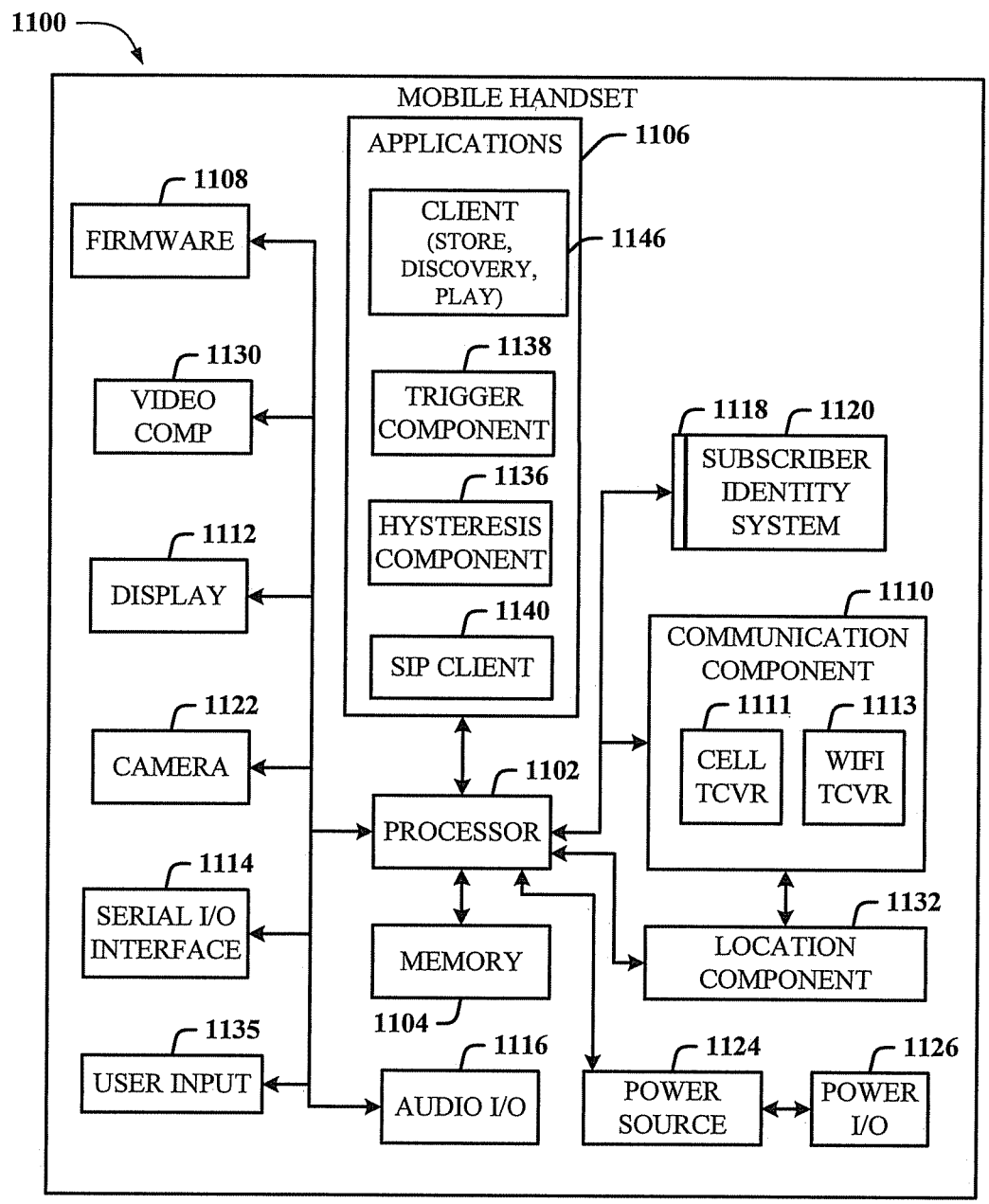
FIG. 11 illustrates a block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
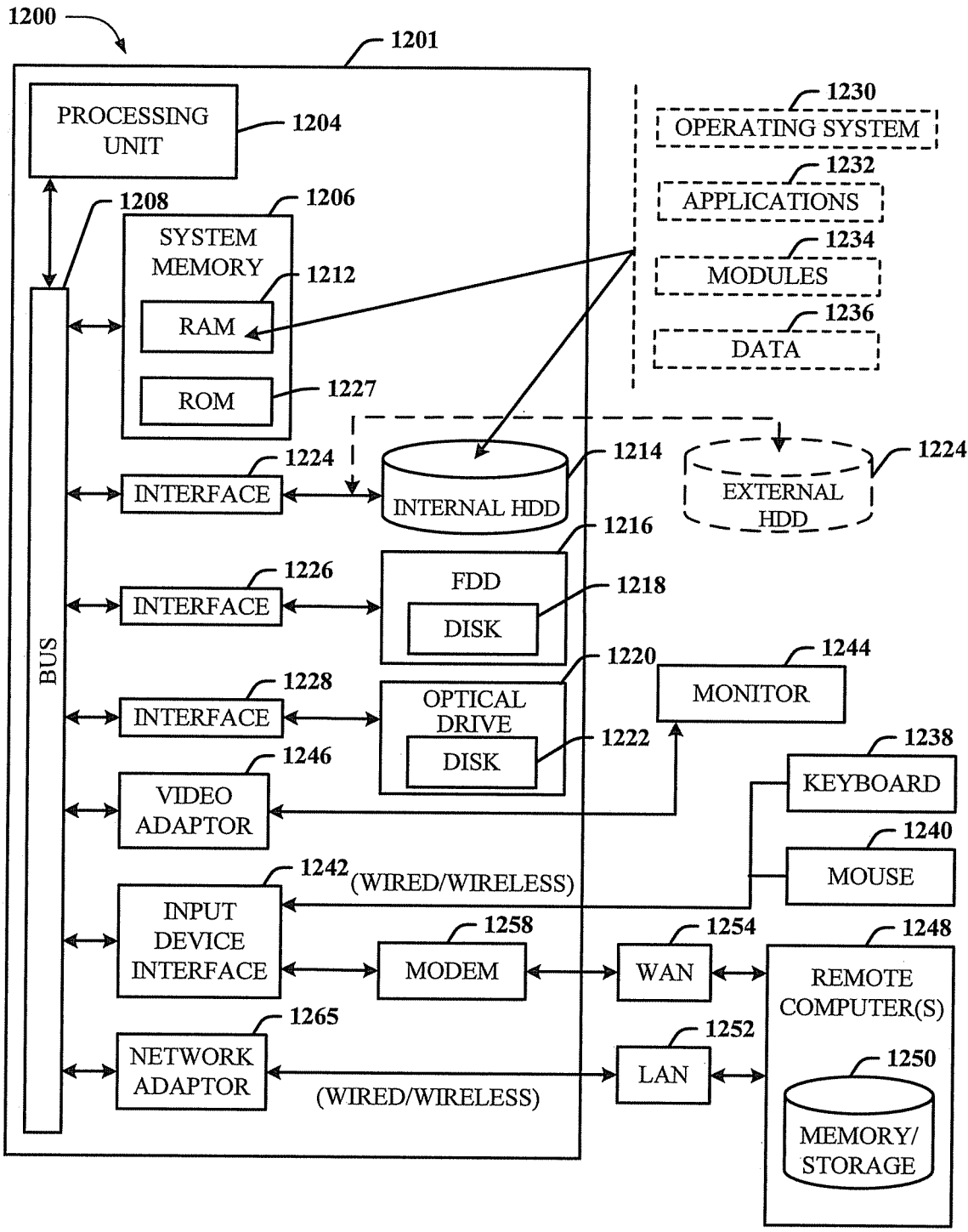
FIG. 12 illustrates a block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a wireless network device comprising a processor, network resource data representing a first network resource and representing a performance parameter of the first network resource;
   monitoring, by the wireless network device, the network resource data for a condition related to network congestion, wherein the condition is based on a historical value associated with the first network resource and a previous usage of the first network resource;
   determining, by the wireless network device, that the condition related to the network congestion has been satisfied based on the network resource data, wherein the determining comprises determining that a threshold value associated with a system information block of the network resource data has been satisfied, wherein the system information block comprises name data associated with a name of the wireless network device, mobile device identification data representative of an identity associated with the mobile device, history data, and priority data representative of a priority associated with the system information block;
   receiving, by the wireless network device, location data representative of a location of a mobile device relative to an access point device;
   in response to the determining that the system information block comprises the name data, the mobile device identification data, history data, and the priority data, performing, by the wireless network device, an action in response to the condition related to the network congestion being determined to have been satisfied, wherein the action comprises increasing a first data transmission time associated with the first network resource from a first time to a second time greater than the first time; and
   based on a priority value associated with a second network resource, decreasing, by the wireless network device, a second data transmission time from a third time to a fourth time less than the third time.

2. The method of claim 1, wherein the performing comprises adjusting the first data transmission time of the network resource data based on priority data associated with the first network resource.

3. The method of claim 2, wherein the first data transmission time is extended based on the priority data associated with the first network resource.

4. The method of claim 2, wherein the first data transmission time is decreased based on the priority data associated with the first network resource.

5. The method of claim 2, wherein the adjusting the first data transmission time is proportional to the network congestion.

6. The method of claim 2, wherein the condition is a first condition, and further comprising:
resetting, by the wireless network device, the first data transmission time in response to a second condition related to the network congestion being determined to have been satisfied.

7. The method of claim 1, wherein the performing comprises terminating a data transmission of the network resource data based on priority data associated with the first network resource.

8. A system, comprising:
a processor; and
a memory that stores executable instructions that, when executed by the processor, facilitate performance of operations, comprising:
receiving first network message data related to an availability of a first network resource associated with a network device;
receiving distance data representative of a distance of a mobile device from an access point device;
determining whether the availability of the first network resource satisfies a condition, wherein the determining comprises determining that a threshold value associated with the first network message data has been satisfied, wherein the threshold value is a historical value associated with the first network resource and a system information block of the first network resource, wherein they system information block comprises name data associated with a name of the mobile device, mobile device identification data representative of an identity associated with the mobile device, history data, and priority data representative of a priority associated with the system information block;
in response to the determining that the system information block comprises the name data, the mobile device identification data, history data, and the priority data, and based on the determining that the threshold value has been satisfied, and in response to the first network resource being determined to have the availability, adjusting a transmission rate of a second network resource, wherein the adjusting comprises decreasing a data transmission time from a first time to a second time less than the first time based on a priority value associated with the second network resource; and
sending second network message data related to the second network resource.

9. The system of claim 8, wherein the adjusting comprises delaying a transmission of the second network resource.

10. The system of claim 8, wherein the first network resource comprises bandwidth data.

11. The system of claim 8, wherein the condition is related to time data associated with the first network resource.

12. The system of claim 8, wherein the first network resource comprises a radio resource associated with a second network device.

13. The system of claim 8, wherein the transmission rate is a first transmission rate, and wherein the condition comprises a statistical value associated with a second transmission rate used previous to the first transmission rate.

14. The system of claim 8, wherein the adjusting comprises terminating the first network resource based on priority data associated with the second network resource.

15. A non-transitory machine-readable storage medium, comprising executable instructions that, when executed by a processor, facilitate performance of operations, comprising:
receiving first network message data related to an availability of a first network resource associated with a network device;
prioritizing the first network resource based on classification data, wherein the prioritizing results in network resource priority data;
based on the first network message data and the network resource priority data, determining that the first network resource is available, wherein the determining comprises determining that a threshold value associated with the first network message data has been satisfied, and wherein the threshold value is a historical value associated with a previous usage of the first network resource and associated with a system information block of the first network resource, wherein the system information block comprises name data associated with a name of the network device, mobile device identification data representative of an identity associated with the mobile device, history data associated with the system information block, and priority data representative of a priority associated with the system information block;
in response to the determining that the system information block comprises the name data of the network device, the mobile device identification data, history data, and the priority data and in response to the determining that the threshold value has been satisfied, increasing a first transmission rate of a second network resource, and decreasing a second transmission rate of the first network resource; and
in response to the increasing the first transmission rate of the second network resource, sending second network message data related to the second network resource to a mobile device.

16. The non-transitory machine-readable storage medium of claim 15, wherein the operations further comprise:
receiving an indication that the second network data is being displayed by the mobile device.

17. The non-transitory machine-readable storage medium of claim 15, wherein the operations further comprise:
receiving time data related to a predicted availability time of the first network resource.

18. The non-transitory machine-readable storage medium of claim 15, wherein the second network message data comprises a bandwidth associated with the second network resource.

19. The non-transitory machine-readable storage medium of claim 15, wherein the increasing of the first transmission rate is proportional to congestion determined to be experienced by the network device.

20. The non-transitory machine-readable storage medium of claim 15, wherein the first network message data comprises data related to a frequency of use of the first network resource.

* * * * *